United States Patent [19]
Davis

[11] 3,737,671
[45] June 5, 1973

[54] DEMAND CONTROLLER

[75] Inventor: Bernard T. Davis, Evergreen Park, Ill.

[73] Assignees: Raymond C. Wells; Ralph E. Wells, Power Lake, Wis.; part interest to each

[22] Filed: May 18, 1972

[21] Appl. No.: 254,455

[52] U.S. Cl. ............................... 307/126, 307/149
[51] Int. Cl. ............................................. H02h 3/42
[58] Field of Search ........................... 307/149, 126; 317/262 R

[56] References Cited
UNITED STATES PATENTS

| | | | |
|---|---|---|---|
| 2,036,298 | 4/1936 | Reagan | 307/126 |
| 2,036,434 | 4/1936 | Paden | 307/126 |
| 2,992,365 | 7/1961 | Brill | 307/126 |
| 3,296,452 | 1/1967 | Williams | 307/126 |

*Primary Examiner*—L. T. Hix
*Attorney*—Carlton Hill, Benjamin H. Sherman, Charles F. Meroni

[57] ABSTRACT

A demand controller which allows the application of power to be units to be selectively disconnected so as to assure that the power demand does not exceed preset limits. Since electrical power companies bill on a basis such that additional charges are made for maximum demand rates occurring during monitored intervals, substantial savings in power bills can be made by limiting the maximum demand. The present invention monitors the actual demand and compares it with the theoretical ideal maximum demand and disconnects loads when the actual demand exceeds the theoretical ideal demand over a standard time period. Provisions are made for synchronizing the demand controller with the time interval utilized by the power company to assure accurate control of the billing rates.

9 Claims, 2 Drawing Figures

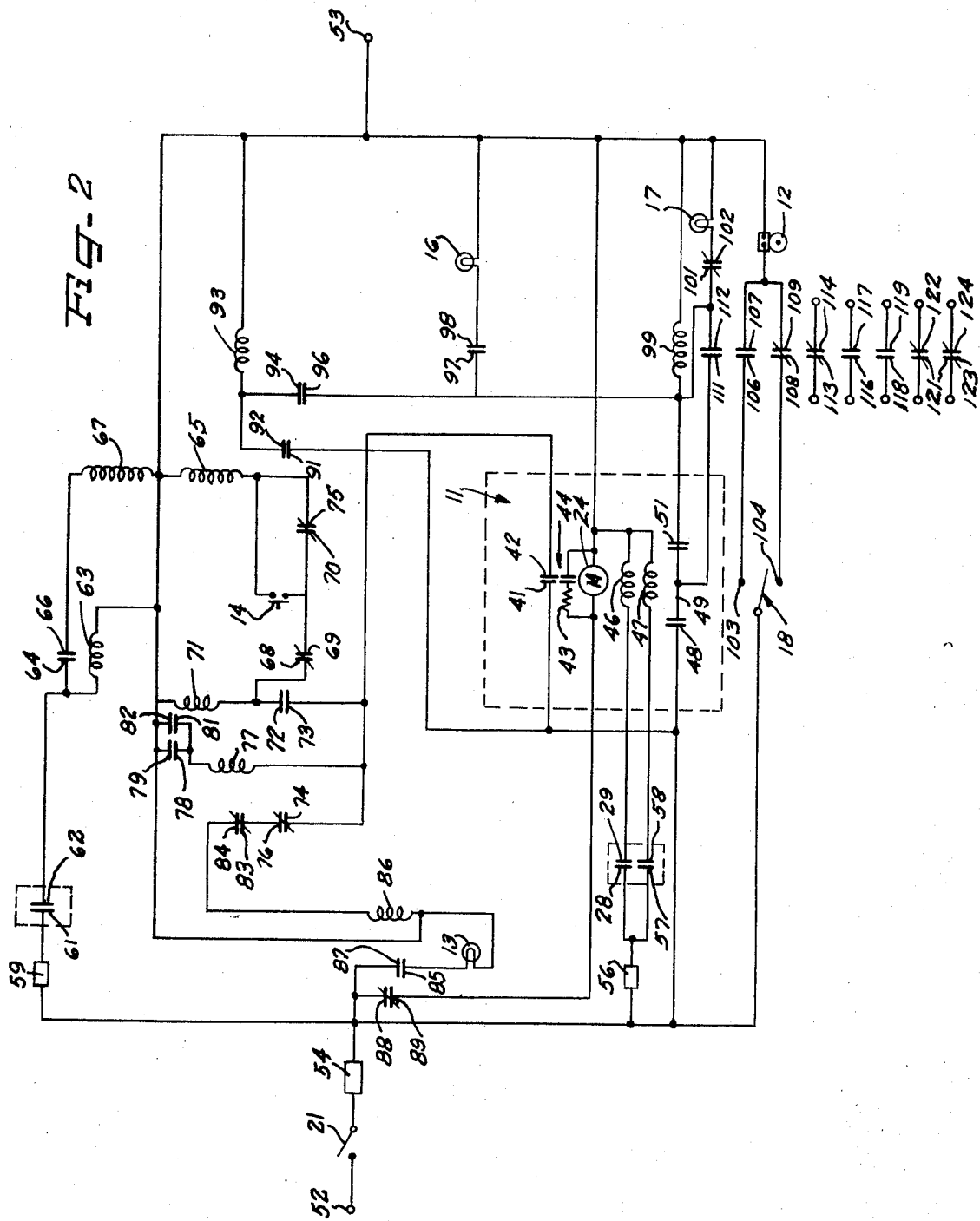

3,737,671

DEMAND CONTROLLER

BACKGROUND OF THE INVENTION

1. Field of the Invention

This invention relates in general to monitoring and control of electrical power so as to avoid excessive billing rates due to undesirably high demand and in particular to a new and improved demand controller.

2. Description of the Prior Art

Demand limiting meters such as General Electric Meters Type GM-10, GMS-10 and GMS-11 are designed for connection to watt hour meters which produce output pulses indicative of the power demand as determined by the watt hour meter. This input is supplied to drive an actual demand mechanism which has a pointer that advances in a step-by-step motion and indicates the actual demand during a time interval. An ideal demand mechanism in the meter is driven by a synchronous motor which also drives an offset cam which makes one revolution during the time interval. The offset cam causes the ideal demand pointer to reset at the end of the time interval. A pair of alarm contacts move with the actual demand pointer and the ideal demand pointer and are actuated if the actual demand pointer coincides with the ideal demand pointer. When these contacts close, an electrical circuit is completed so that units drawing power may be disconnected thus reducing the actual demand, or an alarm sounded to indicate excess demand.

SUMMARY OF THE INVENTION

The present invention comprises a control circuit connectable in circuit with a demand limiting meter of the General Electric type to provide means to disconnect the controlled electrical power using equipment, sound an alarm, and to provide for automatic synchronization so that the limiter is reset at the same time that the power company demand interval commences. This assures that the demand charge will not be greater than the preset desired maximum. If the limiter were not synchronized with the power company the desired demand limit could be exceeded resulting in a higher charge than desired for the consumer.

Other objects, features and advantages of the invention will be readily apparent from the following description of certain preferred embodiments thereof taken in conjunction with the accompanying drawings although variations and modifications may be effected without departing from the scope and spirit of the novel concepts of the disclosure and in which:

BRIEF DESCRIPTION OF THE DRAWINGS

FIG. 2 is an electrical schematic of the invention.

DESCRIPTION OF THE PREFERRED EMBODIMENTS

Figure 1:
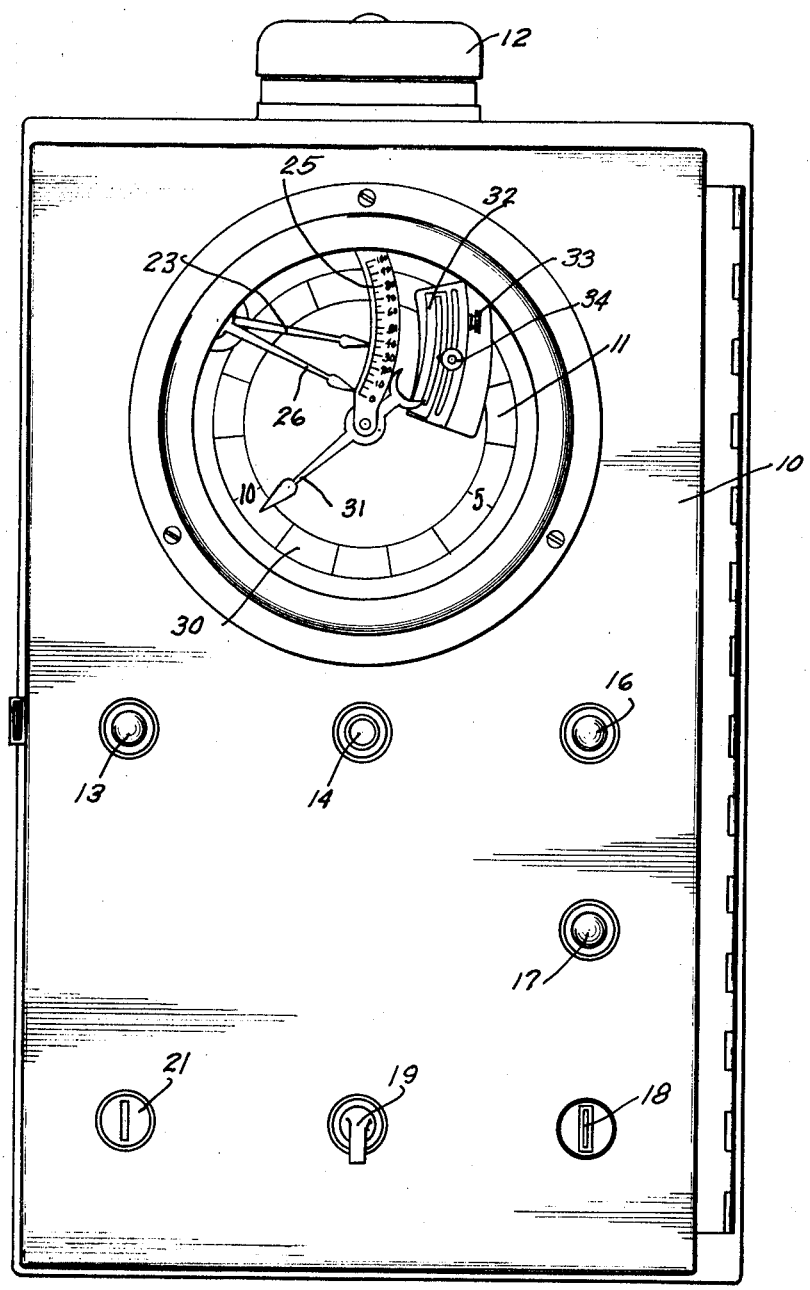
FIG. 1 is a view of the demand controller of this invention.

FIG. 1 illustrates the demand controller of this invention and comprises a container 10 in which a demand limiting meter 11 is mounted. The demand limiting meter 11 may be a General Electric Type GM-10, GMS-10 or GMS-11, or other suitable demand limiting meter. An alarm bell 12 is mounted on casing 10. A synchronizing indicator light 13 is mounted on the front of the case 10 as well as a reset push button 14. A lock-out ON indicator light 16 and a demand limit ON light 17 are also mounted on the case 10. An alarm reset selector switch 18 is mounted on the case 10 as well as a load selector switch 19. A key control switch 21 is provided with a key so as to provide security for turning the demand controller on or off.

The demand limiting meter 11 has an ideal demand pointer 23 which is driven by a clock motor 24 shown in FIG. 2 and moves against the scale 25 to indicate the ideal demand. A second pointer 26 indicates the actual demand and is driven by an advance coil 46 and a return coil 47 as shown in FIG. 2. Demand pulses supplied by the power company or similar suitable watt hour meter will alternately actuate to close relay contacts 28 and 29, thereby energizing coil 46; then close relay contacts 57 and 58 thereby energizing coil 47 while simultaneously opening contacts 28 or 29. Each separate alternating energization of coil 46 and then 47 will cause the actual demand pointer to move one unit and full scale of the pointer might be, for example, 100 units.

A time interval pointer 31 is also driven by the clock motor 24 and moves against scale 30 to indicate the elapsed time during the interval. A scale 32 is provided indicating the percent of full scale travel of the ideal demand pointer 23, and therefore the predetermined maximum demand at the end of the full time interval. An adjustment setting 34 is provided for setting this predetermined maximum demand and indicating this along scale 32. A second adjustment setting 33 allows the starting position of the ideal demand pointer 23 to be set above its zero point. By properly setting adjustments 33 and 34, the rate of demand pulses may exceed the ideal rate early in the time interval provided the rate of demand pulses received is equivalently lower than ideal during the later part of the time interval without exceeding the preset maximum demand for the total time interval.

Contacts 41 and 42 are periodically closed for a short period by a cam driven by timing motor 24 each time this cam mechanically causes the actual demand pointer 26 and ideal demand pointer 23 to reset at the start of a new time interval. A heater 43 is connected in parallel with the timing motor 24 and in circuit with temperature responsive switch 44 so as to turn on the heater when the temperature drops below a preset temperature as, for example, 40° F. Alarm contacts 48, 49 and 51 are mounted on the actual demand pointer 26 and controlled by its relative position to the ideal demand pointer 23 such that contact pair 48 and 49 close a few pulses before the two pointers 23 and 26 coincide. Contact pair 49 and 51 close (with contacts 48 and 49 remaining closed) whenever the actual demand pointer 26 and ideal demand pointer 23 coincide. The reverse of this contact action occurs as the ideal pointer 23 again leads the actual demand pointer 26 up the scale.

As shown in FIG. 2, power lines may be connected to power terminals 52 and 53, respectively. Terminal 52 is connectable through the key operated switch 21 to a fuse 54 which has its opposite side connected to contact 48. Fuse 54 is also connected through a fuse 56 to remote relay contacts 28 and 57, which alternately close their respective contacts 29 and 58 to supply pulses to advance coil 46 and return coil 47. These relay contacts duplicate the revenue meter pulses from the power company watt hour meter.

A fuse 59 has one side connected to fuse 54 and the other side to contact 61 of a remote relay which operates to close its contacts 61 and 62 when energized by a time interval pulse from the power company revenue demand meter. This time interval pulse occurs briefly as the power company metering interval is completed at the end of a demand period, for example, every 30 minutes.

A relay coil TU 63 has one side connected to contact 62 and the other side is connected to terminal 53. Thus, relay TU is energized when contacts 61 and 62 engage. Relay TU, 63, closes contacts 64 and 66 to energize ML latch relay 67 which has its opposite side connected to terminal 53. Relay TU, 63, opens contacts 68 and 69 when it is energized. A relay 71 has one side connected to terminal 53 and its other side is connected to contact 68. The same side of relay 71 is also connected to ML contact 72 which engages contact ML 73 when the ML relay 67 is energized. Contact 73 is connected to contact 42 and also to contact ML 74 which engages contact ML 76, and open when ML relay 67 is latched.

A relay 77 has one side connected to contact 73 and the other side is connected to contacts 78 and 81. The mating contact 79 for contact 78 is connected to terminal 53. The mating contact 82 for contact 81 is connected to terminal 53. Relay 77 controls contacts 78 and 79 and relay 71 controls contacts 81 and 82.

Contact 83 is connected to contact 76 and its mating contact 84 is connected to a synchronizing relay 86 which has its opposite side connected to power terminal 53. Relay 77 controls contacts 83 and 84, which are closed when relay 77 is not energized and 78 and 79 which are closed when relay 77 is energized. Sync ON light 13 is connected to terminal 53 and to contacts 85 and 87 which are controlled by Sync relay 86. Contact 87 is connected to fuse 54. Contact 88 is connected to fuse 54 and has a mating contact 89 which is connected to one side of the timing motor 24. Contacts 88 and 89 are controlled by Sync relay 86 and are opened when it is energized.

A contact 91 mates with contact 92 and is controlled by the ML relay 67. Contact 91 is connected to the fuse 54 and contact 92 is connected to a time delay relay LO 93 which has its opposite side connected to terminal 53. The relay 93 may be a pneumatic time delay relay or a solid state time delay relay which actuates from 10 seconds to 1 minute after power is applied to its energizing coil. LO contacts 94 and 96 are controlled by relay 93 and are connected between contacts 92 and 51. Contact 97 is connected to contact 96 and mating contact 98 is connected to lock-out lamp 16 which has its opposite side connected to terminal 53. Contacts 97 and 98 are controlled by relay LO 93. Contact 96 is connected to CR relay 99 which has its opposite side connected to terminal 53. Contact 96 is also connected to LO contact 101 which mates with contact 102. Demand limit light 17 is connected between contact 102 and terminal 53. Alarm reset switch 18 has its movable contact connected to fuse 54 and is movable between contacts 103 and 104. Contact 103 is connected to contact 106 which mates with contact 107 to complete a circuit to the alarm bell 12. Contact 104 is connected to contact 108 which mates with contact 109 to complete a circuit to the alarm bell 12. Contacts 111 and 112 are mounted in parallel with contacts 49 and 51.

A plurality of control contacts 113, 114, 116, 117, 118, 119, 121 and 122, 123, 124 are controlled by the CR relay 99. This relay also controls contacts 106, 107, 108, 109, 111 and 112. These contacts control the trips for the loads to be removed if predetermined demand is exceeded and may be connected to circuit breakers or contacters for removing certain loads on a priority bases when the relay CR 99 is energized.

When the key switch 21 is closed, electrical energy will be available at contacts 28 and 57 through fuse 56. Contact pairs 28 and 29 and contact pairs 57 and 58 will alternately open and close at a rate determined by the metered energy use of the watt hour meter connected to the controlled load source.

When contact pair 28 and 29 close, advance coil 46 is energized. When contact pair 57 and 58 are closed, return coil 47 is energized. At each alternation of energizing coil 46 and 47, the actual demand pointer 26 is advanced one unit up the scale 25.

Should the rate of advance of actual demand pointer 26 be such as to cause it to overtake the ideal demand pointer 23, contact pair 48 and 49 will be caused to close a few pulses before the pointers 25 and 23 coincide. Since contact pairs 49 and 51 and contact pairs 111 and 112 are open, no action will take place at this time.

Should the rate of advance of actual demand pointer 26 remain greater than the rate of advance of ideal pointer 23 so as to cause the pointers to coincide, contact pair 49 and 51 will close, energizing relay CR 99 and limit on light 17 through closed contacts 101 and 102.

Relay CR 99 will close its contact pair 111 and 112 to parallel contact pair 49 and 51; and contact pair 106 and 107. It is assumed that alarm reset selector switch 18 will be in position to close contacts 18 and 103 (otherwise alarm 12 would be sounding). Closing of contact pair 106 and 107 will cause alarm 12 to sound. Manual operation of the alarm reset selector to open contact pair 18 and 103 and close contact pair 18 and 104 at this time will cause alarm 12 to cease sounding, since energized relay CR 99 has opened its contact pair 108 and 109.

Energizing relay CR 99 will also operate contact pairs 113 and 114; 116 and 117; 118 and 119; 121 and 122; 123 and 124. These contact pairs will be connected as required for either energized or deenergized tripping of the circuit breaker or contacts of the controlled power loader, through appropriately wired selector switch 19 if desired by the user.

Since in proper application, the disconnected controlled power load should decrease the rate of advance of actual demand pointer 26 to less than the rate of advance of ideal demand pointer 23 contact pair 49 and 51 will open as the pointers again do not coincide. Since contact pair 49 and 51 are now paralleled by CR 99 relay closed contacts 111 and 112, no action will occur at this time. This feature prevents CR relay 99 from pulsing in and out should the pointers lose coincidence at a slow rate.

When actual demand pointer 26 lags behind ideal pointer 23 a few pulses, contact pair 48 and 49 will open, deenergizing relay CR 99 and limit on light 17.

Deenergizing CR 99 relay will cause its contact pair 108 and 109 to close, which will cause alarm 12 to be energized through alarm reset selector switch 18, at this time in position to have its contact pair 18 and 104 closed, as previously described, sounding the alarm to alert the user that he may restart the controlled power equipment. The user may then manually operate alarm reset selector switch to open contact pair 18 and 104 to cause the alarm to cease, and closing contact pair 18 and 103 setting the alarm circuit into proper position for the next excess demand cycle. Deenergizing CR 99 relay will also cause contact pairs 113 and 114; 116 and 117; 118 and 119; 121 and 122; 123 and 124 to operate. These contact pairs will again assume a position to allow the appropriate circuitry so that the user may restore the controlled power loads to service.

Thus the above described circuitry will operate to control the user rate of power demand to remain within the ideal rate as set in the demand limiting meter 11, alerting him to when the controlled load is disconnected and when it may be reconnected, with the direct operator of the equipment able only to reset the alarm, assuming that management has retained the key to key switch 21.

SELF SYNCHRONIZING ASPECT

In operation, when the key switch 21 is closed and when a time reset pulse is received from the power company which closes contacts 61 and 62, TU 63 relay will be energized since its opposite side is connected to power terminal 53. When relay TU 63 is energized it closes contacts 64 and 66 which will energize ML latch relay 67 which will remain latched until reset by reset coil ML 65. Relay TU 63 will also open contacts 68 and 69 preventing energizing the ML reset coil 65 through contacts ML 72 and 73 which close when ML 67 is energized, should contacts 41 and 42 be closed during the time relay TU 63 is energized. The ML relay 67 also closes contacts 91 and 92 which energize the time delay relay coil LO 93. ML relay 67 will also open contacts 74 and 76 to deenergize synchronizing relay 86 should it have been energized. Relay 93, now energized by the closing of ML contacts 91 and 92 will operate contacts 97 and 98 to close and complete a circuit from contact 96 to LOCKOUT LITE, 16 and operate contacts 101 and 102 to open the circuit to LIMIT LITE, 17 at once.

Should LO 93 remain energized a sufficient time to reach its set time delay, (ML relay 67 remains latched for this interval), contacts LO 94 and 96 will close to complete a circuit from line fuse 54 through ML contacts 91 and 92, energizing CR relay 99 and LOCKOUT LAMP 16; contacts LO 70 and 75 will open to prevent ML reset coil 65 from being energized unless or until reset button 14 is closed to complete a circuit through contacts TU 68 and 69; contacts ML 72 and 73 and contacts 41 and 42.

Thus, should the utility time pulse from contacts 61 and 62 precede the time pulse from contacts 41 and 42 in the demand limiting meter 11 by more than the time delay setting of relay LO 93, relay CR 99 will operate to remove the selected power consuming equipment to limit the users rate of electrical energy demand; light the LOCKOUT light; and sound the alarm bell.

CR 99 relay will remain energized and the selected equipment "locked out" from operation simultaneously until the reset contacts 14 are manually closed and the time hand of demand limiting meter 11 is advanced to close contacts 41 and 42 to bring this time into synchronization with the utility time interval.

If instead, the demand limiting meter time pulse should occur before the utility time pulse, contacts 41 and 42 will mechanically close when the demand limiting meter 11 time hand reaches approximately the end of its design time interval setting. Contacts 41 and 42 will not reopen until the timing motor 24 drives the time hand mechanism a short distance further.

Closing of the contacts 41 and 42 will complete a circuit from line fuse 54, through contacts 41 and 42; contacts ML 74 and 76, (which will be closed since ML 71 is not latched); and contacts Y 83 and 84, (which will be closed since relay Y 77 is deenergized); through relay coil SY 86 to opposite line terminal 53.

Energizing relay SY 86 will cause contacts SY 88 and 89 to open, deenergizing timing motor 24 of the demand limiting meter 11, causing the timing mechanism to stop and thus contacts 41 and 42 to remain closed.

Energizing relay SY 86 also will cause contacts SY 85 and 87 to close, completing a circuit from line fuse 54; through contacts SY 85 and 87; and SYNCH light 13 to opposite line terminal 53.

Thus, should the demand limiting meter time pulse occur before the utility time pulse, the demand limiting meter timer 24 will stop and the SYNCH light will indicate the reason why it is not running. This will continue until a utility time pulse occurs.

When the utility time pulse occurs, as previously described, relay ML 67 will latch, and contacts ML 72 and 73 will close.

As in the before described actions, relay coil X-71 will be energized through the previously established circuit from line fuse 54; through limiting meter contacts 41 and 42.

Energizing of relay coil X 71 will cause contacts X 78 and 79 to close, energized relay coil Y 77 from the previously established circuit from line fuse 54 through limiting meter contacts 41 and 42.

Energizing relay coil Y 77 will close contacts Y 81 and 82, which are in parallel electrical connection to contacts X-78 and 79. It will also open contacts X 83 and 84 in the circuit to relay coil SY 86 causing it to deenergize.

Deenergizing of relay SY 86 will open contacts SY 87 and 85 and light SYNCH light 13 will go out; contacts SY 88 and 89 will close, allowing the limiting meter timer motor 24 to start operating again. Thus, should the demand limiting meter time pulse occur before the utility time pulse causing the demand limiter timer motor 24 to stop, it will restart when a utility time pulse occurs and thus become in synchronism with it.

As previously described when contacts 61 and 62 close to indicate a utility time pulse, relay coil TU 63 will be energized through a circuit from line fuse 54; through fuse 59, through contacts 61 and 62; through relay coil TU 63 to opposite line terminal 53.

As previously described, energizing relay coil TU 63 will cause contacts TU 64 and 66 to close, thus causing ML relay 67 to latch.

Energizing relay coil TU 63 also will open contacts TU 68 and 69, preventing reset coil ML 65 from being energized until relay coil TU 63 is deenergized when utility time pulse contacts 61 and 62 are open.

Thus, should both the utility time pulse and demand limiting time pulse occur simultaneously, relay ML 67 latch and ML 65 reset will not oscillate between themselves.

Subsequent to the opening of utility time pulse contacts 61 and 62, (1) should their closing and opening occur while demand limiting meter contacts 41 and 42 are closed, or (2) should the closing of contacts 41 and 42 occur after utility time pulse contacts 61 and 62 have closed and reopened but before the time delay of relay LO 93 occurs, the following would occur.

Relay coil ML 67 will have been energized and will be in the latched position. Relay LO 93 will be energized and in its time delay interval sequence, as previously described.

When relay coil TU 63 is deenergized and demand limiting meter contacts 41 and 42 close or have been closed as previously described, relay reset coil ML 65 will be energized through a circuit from line fuse 54; through demand limiting meter contacts 41 and 42; through contacts ML 72 and 73, (closed when ML 67 is latched); through contacts TU 68 and 69, (closed when TU 63 is deenergized); through contacts LO 70 and 75, (closed unless relay LO 93 has timed out its set interval); through reset relay coil ML 65 to the opposite line terminal 53.

Thus, when ML 67 relay has been placed in the latch position and when the utility time pulse has ceased, if the demand limiting meter time pulse occurs within the preset time interval of relay LO 93, reset relay coil ML 65 will cause relay ML 67 to unlatch and relay LO 93 to cease timing and reset to the start of its set interval. Relay CR 99 will not be energized in its LOCKOUT position.

As previously described, when contacts 41 and 42 close, either simultaneously with or subsequent to a utility time pulse, relay X 71 will cause relay Y 77 to become energized. Relay Y 77 will remain energized through contacts Y 81 and 82 as previously described even after ML 67 has reset from the latched position by energizing reset coil 65 and contacts ML 74 and 76 have closed.

Thus relay Y 77 will continue to keep the circuit to relay coil SY 86 open, assuring that demand limiting meter timer motor 24 will continue to operate until the demand limiting timing mechanism opens contacts 41 and 42.

Therefore, (1) should a utility time pulse precede the time pulse of the demand limiting meter by an interval of less than the time interval set in relay LO 93, no action will be taken by the demand controller; (2) should the time pulse of the demand limiting meter occur before the time pulse of the utility, the timing devices of the meter will stop and not restart until the utility time pulse occurs and closes again; (3) should both time pulses occur simultaneously, the utility pulse will take precedence and reset for another timing cycle will occur without oscillation; (4) should the utility pulse occur later and out of synchronization with the demand limiting meter time pulse by a greater than set time interval, the controlled electrical loads will be disconnected and the alarm will sound. The controlled electrical loads cannot be restored to service until the demand limiting meter time interval mechanism has been brought into synchronism by simultaneously depressing the reset button and manually advancing the demand limiting meter time hand to the end of its interval.

The key switch 21 is intended to be controlled by user management and will inactive all controller circuits if operated to its off position.

Like all demand controllers, the demand controller requires information about rate of use of electric power, in the form of pulses representing kilo watt hours used by the controlled equipment during the utility demand time period. In most cases, the utility will supply these pulses for some nominal monthly charge. Pulse rates of 200 or 400 per demand period, and demand time intervals of 15 minutes or 30 minutes, can be used. Other pulse rates and time periods may be used.

Pulse rates, the electrical demand rate, are continuously compared against the desired rate set in the demand controller over the demand time period. The two large and distinct hands on the meter face clearly indicate this comparison at all times. The demand controller functions whenever the rate of use exceeds the set rate.

Settings can be such as to allow and "over-ride" of pulses during the start of the period, provided there is an "under-ride" at the latter part of the period. This prevents nuisance trips and limits shutdown of equipment to periods of time just long enough to stop those "spikes" of demand that occur occasionally and which are more costly than the productivity lost. In most shops, forced shutdown time will be measured in minutes per day or week. In many shops it is found that the demand controller acts to enforce scheduling, eliminating former costly time lags and no actual productivity was lost in the shop.

Should the power load be such that the management-set demand rate will be exceeded, the equipment will be tripped off the line long enough to reestablish the proper set rate. When the equipment is tripped off line, an alarm sounds and a signal light on the controller shows "Limit ON."

The operator must operate the "Alarm Reset" to silence the bell, but cannot restore the equipment to service while the limit light is on.

When the demand rate is again within set limits, the alarm will sound and the limit light will go out. The operator must again operate the "Alarm Reset" to silence it. He may now restore the equipment to use at the original power level or at some lower level sufficient to stay within limits. The controller is again active.

The operator cannot do anything but silence the bell. In one case he silences the bell and set the controller to alert him to when the equipment can be restored. In the other, he silences the bell and sets the controller into the normal operating position again. Only management can shut off the demand controller using the key operated switch provided.

To accurately control the plant electrical demand, a demand controller must have the same time period as the utility billing meter, and must stay in step with the utility at all times.

If a "time pulse," (indicating when the utility revenue meter demand reset occurs) is available, the demand controller will "self-synchronize." Most utilities will also provide this pulse at a nominal montly fee.

Should the controller time period lead the utility time period, for some reason such a temporary loss of electrical power to either utility metering or the controller, the "self-synchronizer" will automatically stop the controller clock until the time periods of utility and controller are again matched. The controller will restart automatically at that time. During the synchronize period, the equipment will continue in service unless the demand rate is exceeded, but a Sync "ON" light remains lighted to indicate why the controller "time hand" has stopped.

Should the controller time lag the utility time pulse, (by some preset interval not more than 60 seconds), the equipment will trip out, an alarm light "lock-out" will be on, and the alarm will sound.

The equipment cannot be put back on until a reset button on the controller is depressed and the "time hand" of the "limit meter" is manually advanced to the correct time. The "lock-out" light will go out when the correction is made. The equipment and controller are again ready for normal service.

For complete management control, the glass front of the meter can be locked using the hasp provided and opened only on the seldom occasions needed to set or reset the meter.

Should it be desirable to bypass the controller or to take it out of service for other reasons, the key operated switch will deenergize all circuits except those from the equipment trips.

If a number of devices are to be controlled, it may be desirable to control demand by selectively shedding either of two, or by shedding both of two, devices based on setting of a "selector" switch on the controller. The switch setup allows selection of "Device No. 1"; "Device No. 2"; or "Trip Both." The selector switch is located on the controller panel.

Although minor modifications might be suggested by those versed in the art, it should be understood that I wish to embody within the scope of the patent warranted hereon all such modifications as reasonably and properly come within the scope of my contribution to the art.

I claim:

1. Apparatus for synchronizing the demand period of a utility meter with a demand meter comprising:
   a demand meter with a clock motor;
   time interval contacts controlled by said clock motor;
   an ideal demand pointer driven by said clock motor and to periodically return it to an initial position;
   an actual demand pointer mounted in said demand meter;
   an incremental advance means connected to said actual demand pointer and energized by a signal indicative of power usage;
   a return to zero means for returning said actual demand pointer to an initial position;
   a pair of power terminals;
   a pair of synchronizing contacts in series with said clock motor between said power terminals;
   a synchronizing relay connected to said time interval contacts and to said pair of synchronizing contacts to open them when said synchronizing relay is energized;
   a pair of time interval signal contacts closed by a signal from said utility; and
   control means connected to said time interval signal contacts and first control contacts connected in circuit with said synchronizing relay and controlled by said control means to prevent energization of said synchronizing relay when said time interval occurs before said time interval contacts close.

2. Apparatus according to claim 1 wherein said control means comprises:
   a latch relay with a latch relay winding and a latch release winding;
   said latch relay winding receiving a signal from said utility indicative of the utility time interval and controlling said first control contacts to open them when energized; and
   a second pair of control contacts closed when said latch relay winding is energized and connected in series between said power terminals with said latch release winding and said time interval contacts.

3. Apparatus according to claim 2 wherein said control means includes:
   a time delay relay with a winding and time delay contacts;
   a third pair of control contacts closed when said latch relay winding is energized and connected between said power terminals in series with said winding of said time delay relay;
   a first pair of time delay contacts closed by said time delay relay a predetermined time after said relay is energized; and
   a lock-out circuit controlled by said time delay contacts.

4. Apparatus according to claim 3 wherein said lock-out circuit comprises a lock-out relay.

5. Apparatus according to claim 3 comprising a second pair of time delay contacts connected in series with said latch release winding, said second pair of control contacts and said time interval contacts and opened a predetermined time after said time delay relay is energized.

6. Apparatus according to claim 3 comprising:
   a fourth relay energized by a signal from said utility indicative of utility time interval and controlling a fourth pair of control contacts in series with said latch relay winding to energize it when said fourth relay is energized; and
   a fifth pair of control contacts in series with said latch release winding and opened when said fourth relay is energized.

7. Apparatus according to claim 6 including lock-out contacts controlled by the relative positions of said ideal demand pointer and said actual demand pointer and connected between said power terminals in series with said lock-out relay.

8. Apparatus according to claim 7 comprising:
   a fifth relay with its winding connected in series with said time interval contacts and said second pair of control contacts;
   a sixth relay with one side of its winding connected to one of said time interval contacts;
   sixth and seventh control contacts connected in parallel between the other side of the winding of said sixth relay and one of said power terminals with the sixth control contacts controlled by said sixth relay; and
   the seventh control contacts controlled by said fifth relay.

9. Apparatus according to claim 8 comprising eighth control contacts controlled by said sixth relay and connected in circuit with said synchronizing relay.

* * * * *